Aug. 22, 1939.    O. HEADLAND    2,170,326

FUEL

Filed May 15, 1937

Olga Headland
INVENTOR.

BY

ATTORNEYS.

Patented Aug. 22, 1939

2,170,326

UNITED STATES PATENT OFFICE 2,170,326

FUEL

Olga Headland, Moorhead, Minn.

Application May 15, 1937, Serial No. 142,751

1 Claim. (Cl. 44—15)

My invention relates to an improvement in fuel particularly designed for use in starting fires, for cooking, or for heating purposes.

In the past, various types of fuel have been formed which are highly inflammable and which, therefore, may be readily used for kindling or for various other purposes. This present type of fuel is of this same general class and contains a combination of inflammable materials either in powder form or compressed into brick form, in which the heat content is extremely high. Due to the fact that the fuel contains volatile matter, it is desirable that the fuel be retained in a sealed container or that the material if pressed into solid form, be externally sealed in order to prevent the volatile matter from evaporating.

It is a purpose of my invention to provide a fuel which may be inexpensively manufactured and which may be used for cooking purposes, as it gives off very little smoke or odor in burning. My fuel is particularly advantageous for use on camping trips or the like, where ordinary fuel is difficult to obtain and is often times too wet to be easily used. The high heating content may be enclosed in a small volume of my fuel and accordingly a small amount of my fuel will be sufficient to cook an entire meal.

In starting a wood or coal fire, my fuel may be easily and safely applied to the flame either before or after the fire has been started in order to promote the combustion and to permit the fire to be started more quickly than would ordinarily be possible. My fuel may be sprinkled over the fire in powdered form or may be used in the form of solid cakes which when ignited form a torch lasting a considerable time and providing sufficient heat to ignite coal or wood.

These and other objects and novel features of my invention will be more thoroughly described in the following specification and claim.

In the drawing forming a part of my specification:

In the formation of my fuel, I utilize finely ground straw or corn cobs which have been thoroughly dried to expel the moisture therefrom. This is mixed with a smaller amount of ground lignite coal. A relatively small amount of sulphur is added to this combination, and when this mixture is thoroughly mixed together, denatured alcohol is added. The entire mixture including the alcohol is heated slightly while being mixed together, and a small amount of hot melted paraffin is added thereto. The entire mixture is continuously agitated until the paraffin and alcohol are thoroughly dispersed among the solid materials.

Figure 1:
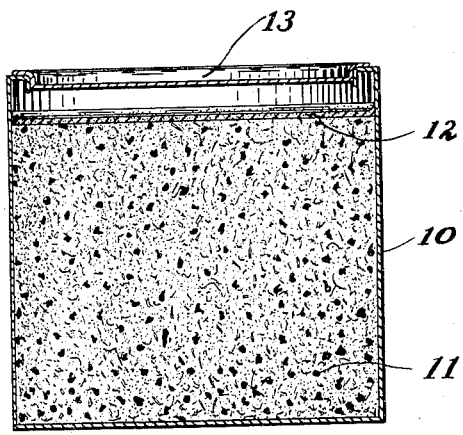
Figure 1 is a cross-sectional view through a container, illustrating some of my fuel contained therein.

When the ingredients have been thoroughly mixed, the fuel is placed into a container such as is illustrated at 10 in Figure 1 of the drawing, and this fuel 11 is sealed from the air by means of a coating of paraffin 12 which covers the entire surface of the fuel. The container 10 is usually equipped with a cover 13 which also acts to prevent the entry of air into the container.

When it is desired to use the fuel for cooking purposes, the center of the paraffin film 12 is usually punctured and the fuel ignited right in the container 10. The heat of the flame will, of course, melt the paraffin film 12 and this paraffin will be absorbed into the body of the fuel 11. If it is not desired to use the entire amount of the fuel 11, it is possible to add another layer of paraffin over the fuel to again seal the fuel from the atmosphere. For short periods of time, however, the cover 13 is usually sufficient to prevent excess evaporation of the fuel.

Figure 2:
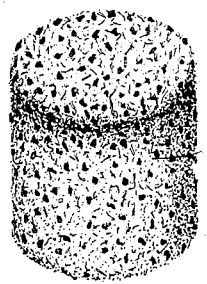
Figure 2 illustrates a pressed cylinder of my fuel which may be sealed by an air tight coating, or which may be inserted in a suitable container.

The foregoing description particularly describes the fuel in powdered or pulverized form. If desired, the fuel may be pressed into any desired shape after the paraffin has been added. Figure 2 of the drawing, illustrates a cylindrical block into which the fuel has been placed. The alcohol and paraffin is sufficient to bind the remaining elements of the combination together so that briquets or blocks of various shapes may be formed.

The cylinder indicated at 14 in Figure 2 is of suitable shape to be inserted into a cylindrical container such as a can or the like, and sealed in place by a suitable container cover. If desired, a coating of paraffin may be inserted over the block 14 as illustrated in Figure 1 of the drawing, to seal the volatile matter within the fuel securely within the fuel.

Figure 3:
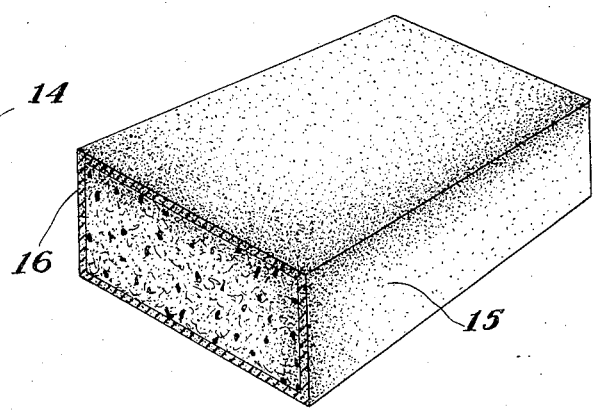
Figure 3 illustrates another shape of block which may be formed with my fuel.

In Figure 3, I illustrate a block of fuel which is rectangular in shape. The outer conformation of the block is not important, and any desired outer shape may be employed. This block indicated at 15 in Figure 3, is provided with an external coating 16 of paraffin in order that the volatile matter within the fuel may be sealed therein.

If it is desired, the fuel may be made without the use of alcohol. In such a formula, the ingredients are approximately the same as in the form described, but a greater amount of paraffin is employed in place of the alcohol. This form of fuel is particularly desirable where the fuel is not to be sealed for, as will be clearly understood, the volatile matter has not been added.

As an example of my fuel, I am presenting the following formula. This formula is designed to provide the proper proportions in amounts desirable for experimental purposes. The same relationship of the quantities used is retained in the manufacture of large amounts of my fuel. My fuel is composed of:

| | | |
|---|---|---|
| Ground straw, dried corn cobs or dried weeds | quarts | 2 |
| Ground lignite coal | do | 1 |
| Sulphur | pinch | 1 |
| Denatured alcohol | pint | 1 |
| Hot melted paraffin | cup | 1 |

As has been stated, the straw, corn cobs, or weeds are thoroughly mixed with the ground coal and sulphur. The alcohol is then added. The mixture is warmed in a closed container and a cup of hot melted paraffin is added and mixed thoroughly with the other ingredients. The fuel is then quickly sealed with paraffin. When cooked it is ready for use.

In accordance with the patent statutes, I have described the process of formation of my fuel as well as the ingredients used therein, and while I have endeavored to set forth the best example thereof, I desire to have it understood that the mixture may be changed within the scope of the following claim without departing from the spirit of my invention.

I claim:

A compressed block of lignite and straw having a substantial quantity of alcohol absorbed therein to render the same more completely combustible, and sealed with paraffin wax to prevent evaporation of the alcohol, said paraffin also acting as a binder.

OLGA HEADLAND.